G. W. SOUTHWICK.
DEVICE FOR FASTENING BELTS.
APPLICATION FILED MAY 29, 1909.
960,121.
Patented May 31, 1910.
3 SHEETS—SHEET 1.
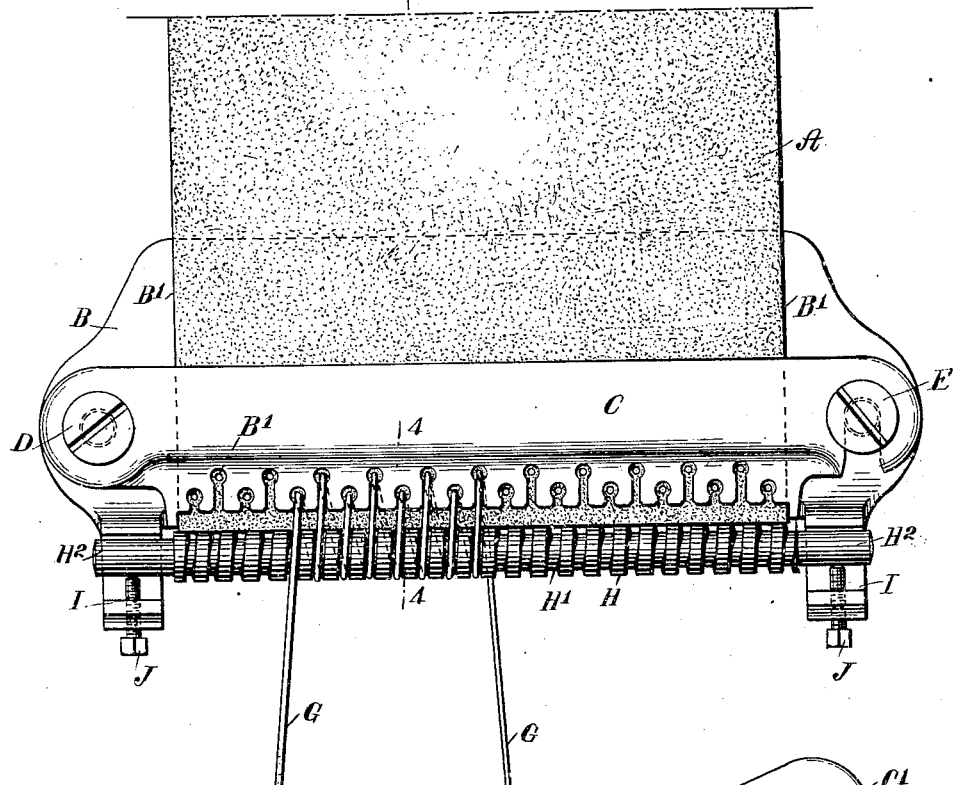
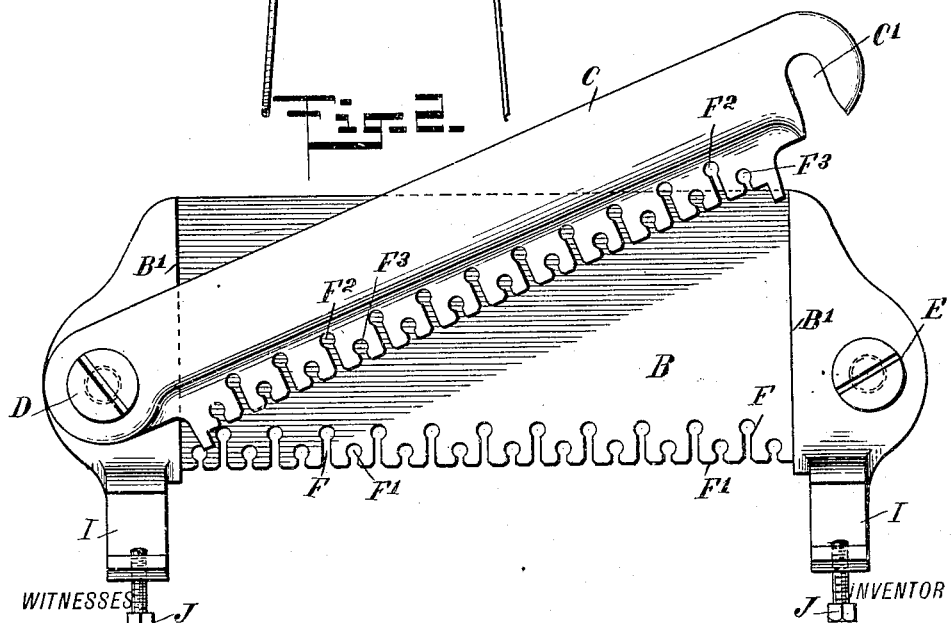
WITNESSES
F. G. Hackenburg.
Rudy Hosted
INVENTOR
George William Southwick
BY
Mumules
ATTORNEYS

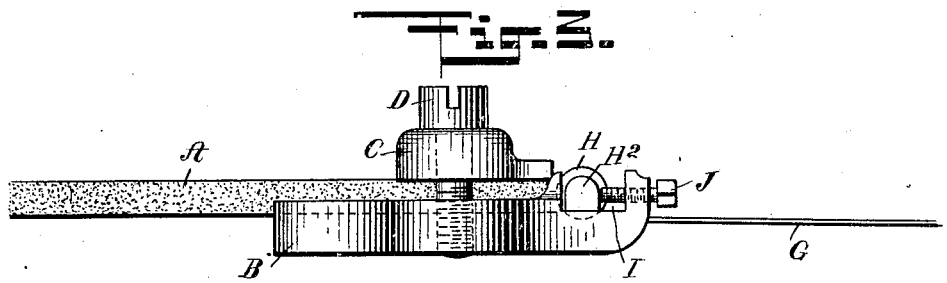
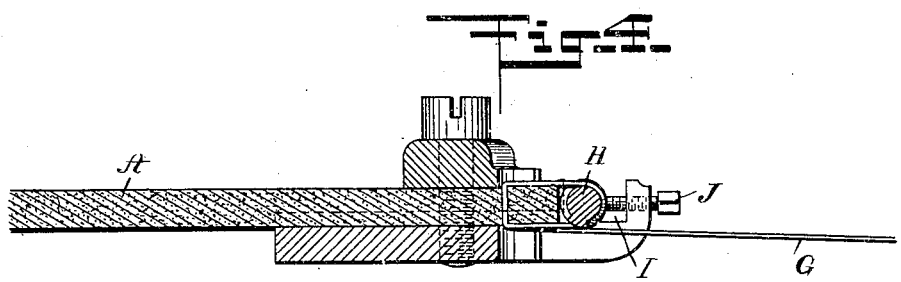
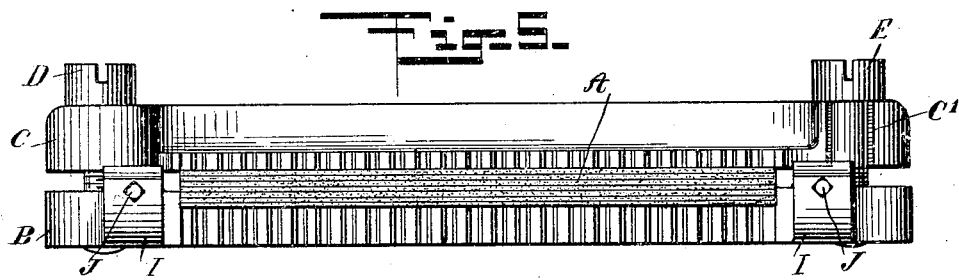
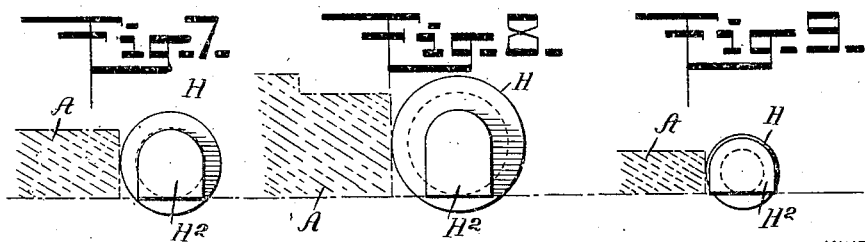

G. W. SOUTHWICK.
DEVICE FOR FASTENING BELTS.
APPLICATION FILED MAY 29, 1909.
960,121.
Patented May 31, 1910.
3 SHEETS—SHEET 3.
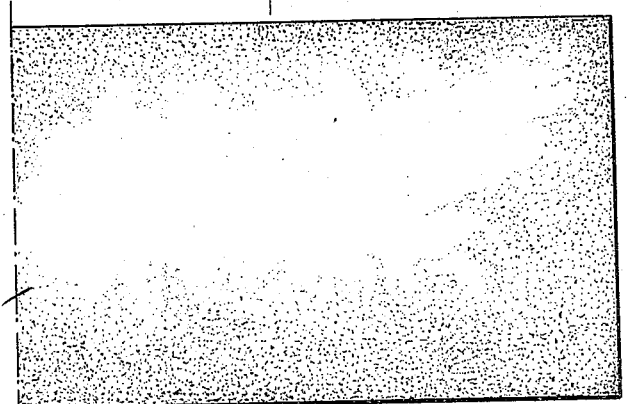
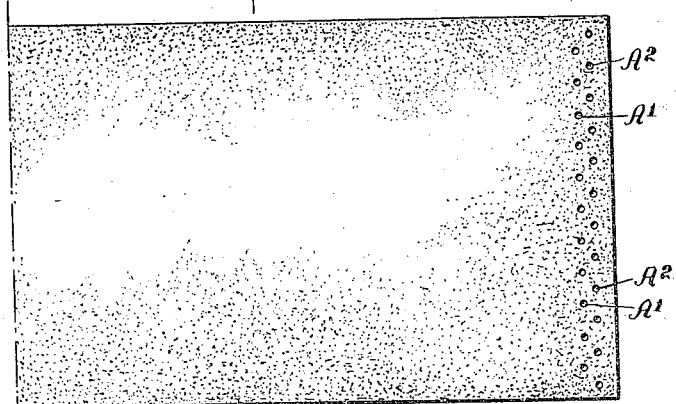
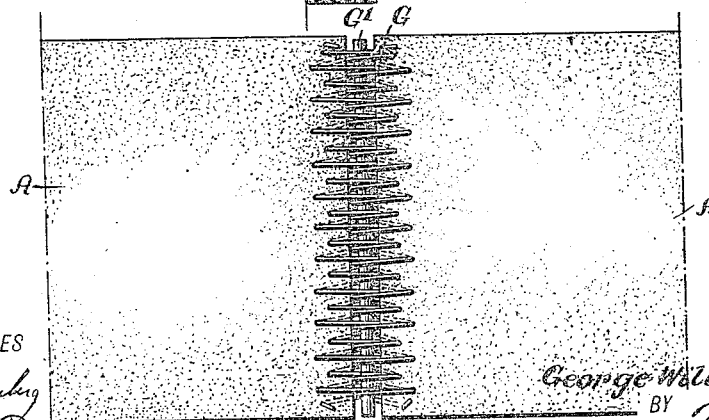
WITNESSES
INVENTOR
George William Southwick
BY
ATTORNEYS

UNITED STATES PATENT OFFICE.

GEORGE W. SOUTHWICK, OF NOROTON, CONNECTICUT.

DEVICE FOR FASTENING BELTS.

960,121.   Specification of Letters Patent.   Patented May 31, 1910.

Application filed May 29, 1909. Serial No. 499,163.

*To all whom it may concern:*

Be it known that I, GEORGE W. SOUTH-WICK, a citizen of the United States, and a resident of Noroton, in the county of Fairfield and State of Connecticut, have invented a new and Improved Device for Fastening Belts, of which the following is a full, clear, and exact description.

The invention relates to belt joints of the hinge type, having wire eyes attached to the belt ends and a pintle engaging the eyes.

The object of the invention is to provide a new and improved device for fastening the ends of a belt, arranged to permit convenient, quick and accurate formation of the wire eyes for the reception of the pintle, and passing the wire through the belt ends in such a manner as to reduce wearing out of the wire to a minimum, at the same time insuring proper alinement and interlocking of the eyes, to produce a belt joint which is exceedingly strong and durable and of the desired flexibility.

For the purpose mentioned use is made of guiding means for guiding a piercing tool to provide the belt with apertures for the passage of the wire used for the hinge eye, and looping means adjacent to the said guiding means and around which the wire is passed to form the hinge eye.

A practical embodiment of the invention is represented in the accompanying drawings forming a part of this specification, in which similar characters of reference indicate corresponding parts in all the views.

Figure 1 is a plan view of the improvement as applied; Fig. 2 is a similar view of the improvement, showing the clamping plate swung back and the grooved looping member removed; Fig. 3 is a side elevation of the improvement as applied; Fig. 4 is a longitudinal section of the same on the line 4—4 of Fig. 1; Fig. 5 is a front elevation of the improvement and showing the belt clamped between the clamping plate and the grooved looping member removed; Fig. 6 is a plan view of the looping member; Figs. 7, 8 and 9 are side elevations of different looping members for belts of different thicknesses; Fig. 10 is a plan view of the belt prior to providing the same with the apertures for the passage of the wire used for forming the hinge eye; Fig. 11 is a like view of the same, showing the belt provided with the rows of apertures for the passage of the wire for forming the hinge eye; and Fig. 12 is a plan view of the belt and the means for connecting the ends with each other by a hinge fastener made by the device.

The belt A is adapted to be clamped between the base plate B and the top clamping plate C, mounted to swing at one end of a clamping screw D as a pivot, the clamping screw D screwing in the base plate B. The free end of the top clamping member C is provided with a slot C', adapted to engage a clamping screw E, located opposite the clamping screw D and likewise screwing in the base plate B. The sides of the base plate B are provided with guiding shoulders B' for the side edges of the belt A to abut against, it being understood that when the belt is in place on the base plate B and the clamping plate C is moved downward by the operator screwing the screws D and E correspondingly, then the belt is securely clamped in position between the plates B and C. The front edge of the base plate B is provided with alternately arranged spaced long and short slots F and F', and similar slots $F^2$, $F^3$ are arranged in the front edge of the top clamping plate C, the said slots F, F' and $F^2$, $F^3$ being in register with each other at the time the top clamping plate C is in clamping position on the belt A, so that the operator by the use of an awl or a similar piercing tool can pierce the belt A, to form the rows of apertures A', $A^2$, as plainly indicated in Fig. 11, it being understood that the piercing tool is guided during the piercing operation in the rear ends of the slots F, F', $F^2$ and $F^3$. As shown in the drawings, the rear ends of the slots F, F', $F^2$ and $F^3$ are enlarged, while the front ends of the slots are made flaring, for the purpose hereinafter more fully described. The wire G, used for forming the eye of the hinge, is passed through the apertures A', $A^2$ in the belt A, and is also passed around a looping member H, preferably in the form of a roller, having a spiral groove H' and having its ends $H^2$ engaging bearings I formed on the front end of the base plate B. Adjusting screws J screw in the bearings I for the ends $H^2$ to abut against, to regulate the distance of the rows of apertures A', $A^2$ from the front terminal edge of the belt, it being understood that the said front edge of the belt is abutted against the looping member H, as shown in Figs. 1, 3, 4, 7, 8 and 9.

It is understood that the convolutions of the spiral groove H' correspond to the number of registering apertures F, F² and F', F³ in the clamping members B and C, so that after the wire is passed through the aperture A' or A² it can readily be bent over into the spiral groove H' and around the same and over the back to the belt on the opposite side thereof, to be passed through the next following aperture, to be again bent forward and back into the spiral groove H', and so on until the wire is passed through all the apertures and looped around the member H to form a hinge eye. The other end of the belt is similarly provided with a hinge eye, but in this case the looping member H³ is used (see Fig. 6), having a spiral groove H⁴ running in opposite directions to the spiral groove H' in the looping member H, as will be readily understood by reference to Figs. 1 and 6. The looping member H³ is provided with the ends H⁵, for engagement with the bearings I, the same as the member H above referred to.

Now it is understood that for forming the eyes on both ends of a belt, the same clamping members B and C are used in connection with the looping members H, H³, having spiral grooves running in opposite directions. Thus the eyes formed on the ends of the belt readily intermesh, as plainly shown in Fig. 12, for the reception of the pintle G', to form a hinge connection between the ends of the belt.

For different sized belts, pairs of spirally grooved rollers H and H³ of different diameters are used, as will be readily understood by reference to Figs. 7, 8 and 9, it being understood that in each case a roller in use at the time in the device forms an abutment for the front edge of the belt.

It is understood that by adjusting the looping member H in the bearings I and abutting the end of the belt A on the said member H, the apertures A', A² can be made to range near to or farther from the end of the belt A, as desired, thus giving the desired hold of the wire hinge members in the ends of the belt. It will also be noticed that by flaring the outer ends of the slots F, F' and F², F³, the wire can be readily bent laterally to the opposite groove H' or H⁴ of the looping member H or H³.

The pitch of the right and left hand spiral grooves H' and H⁴ of a pair of looping members is the same, so that the eyes of the hinge members for a belt readily mesh and the ends of the belt abut without danger of binding, thus insuring proper flexibility of the belt at the joint. By arranging the apertures A', A² in rows, different distances from the end of the belt, the belt material is not unduly weakened, and a large number of apertures and a corresponding number of wire windings for forming the hinge eyes are permissible, to provide an exceedingly strong and durable hinge.

The device can be readily used for forming hinge eyes on leather, woven or other fabric belts, and in case of woven belts the adjustment of the looping members H, H³ may be such that the apertures A', A² are alternately in the front and rear of a corresponding weft thread.

As shown in Figs. 7, 8 and 9, it will be noticed that the looping members H, H³ are preferably of a diameter at the bottom of the spiral grooves H', H⁴ corresponding to the thickness of the belt A, so that the upper and lower portions of the windings of the hinge eyes are parallel and flush with the faces of the belt. It will also be noticed that the under sides of the ends H² and H⁵ and the faces of the bearings I are flush with the upper face of the base plate B on which the belt A rests, to insure the formation of a perfect hinge eye. The ends of the belts may be reduced in thickness, to bring the faces of the hinge flush with the corresponding face of the belt, as indicated in Fig. 8, for instance.

Having thus described my invention, I claim as new and desire to secure by Letters Patent:

1. A device for fastening belts by wire hinges, comprising guiding means for guiding a piercing tool to provide the belt with apertures for the passage of the wire used for the hinge eye, and looping means adjacent to the said guiding means and around which the wire is passed to form the hinge eye.

2. A device for fastening belts by wire hinges, comprising a clamping means for clamping the belt in place, having means for guiding a piercing tool to provide the clamped belt with apertures for the passage of the wire, and a looping member around which passes the wire to form the hinge eye.

3. A device for fastening belts by wire hinges, comprising a pair of plates between which the belt is clamped, the plates being provided with registering guiding slots for the guiding of a piercing tool to provide the belt with apertures for the passage of the wire used for the hinge eye, and a looping member around which the wire is passed to form the eye of the hinge.

4. A device for fastening belts by wire hinges, comprising a pair of plates between which the belt is clamped, the plates being provided with registering guiding slots for guiding a piercing tool to provide the belt with apertures for the passage of the wire used for the hinge eye, and a looping member having spiral grooves for winding the wire spirally to form the hinge eye.

5. A device for fastening belts by wire hinges, provided with a pair of clamping members between which the belt is clamped, the said members having registering slots for the passage of a piercing tool to provide the belt with apertures for the passage of the wire for the hinge.

6. A device for fastening belts by wire hinges, provided with a pair of clamping members between which the belt is clamped, the said members having registering slots for the passage of a piercing tool to provide the belt with apertures for the passage of the wire for the hinge, the said slots being alternately short and long.

7. A device for fastening belts by wire hinges, provided with a pair of clamping members between which the belt is clamped, the said members having registering slots for the passage of a piercing tool to provide the belt with apertures for the passage of the wire for the hinge, the said slots being alternately short and long and enlarged at the inner ends.

8. A device for fastening belts by wire hinges, provided with a pair of clamping members between which the belt is clamped, the said members having registering slots for the passage of a piercing tool to provide the belt with apertures for the passage of the wire for the hinge, the said slots being alternately short and long, enlarged at the inner ends and flaring at the outer ends.

9. A device for fastening belts by wire hinges, comprising a base plate, a clamping plate between which and the said base plate the belt is clamped, the said plates having registering slots alternately long and short for the guiding of a piercing tool to provide the belt with apertures for the passage of the wire for the hinge eye, bearings on the said base plate, and a spirally grooved roller removably held in the said bearings and extending across the edge of the belt, the wire being passed around the grooves to form the hinge eye.

10. A device for fastening belts by wire hinges, comprising a base plate, a clamping plate between which and the said base plate the belt is clamped, the said plates having registering slots alternately long and short for the guiding of a piercing tool to provide the belt with apertures for the passage of the wire for the hinge eye, bearings on the said base plate, and a looping member for removable engagement with the said bearings, the looping member being in the form of a roller and forming an abutment for the end of the belt, the wire being passed around the roller for forming the hinge eye.

11. A device for fastening belts by wire hinges, comprising a base plate, a clamping plate between which and the said base plate the belt is clamped, the said plates having registering slots alternately long and short for the guiding of a piercing tool to provide the belt with apertures for the passage of the wire for the hinge eye, bearings on the said base plate, and a spirally grooved looping member provided at its ends with offsets having sliding engagement with the said bearings.

12. A device for fastening belts by wire hinges, comprising a base plate, a clamping plate between which and the said base plate the belt is clamped, the said plates having registering slots alternately long and short for the guiding of a piercing tool to provide the belt with apertures for the passage of the wire for the hinge eye, bearings on the said base plate, and a spirally grooved looping member provided at its ends with offsets having sliding engagement with the said bearings, the bottoms of the offsets being in alinement with the bottom of the spiral groove in the said looping member.

13. A device for fastening belts by wire hinges, comprising a base plate having parallel guiding shoulders for the side edges of the belt, a clamping plate between which and the said base plate the belt is clamped, the said plates having registering slots alternately long and short for the guiding of a piercing tool to provide the belt with apertures for the passage of the wire for the hinge eye, bearings on the said base plate, and a spirally grooved roller reversibly held in the said bearings and extending across the edge of the belt, the wire being passed around the grooves to form the hinge eye.

14. A device for fastening belts by wire hinges, comprising a base plate, a clamping plate between which and the said base plate the belt is clamped, the said plates having registering slots alternately long and short for the guiding of a piercing tool to provide the belt with apertures for the passage of the wire for the hinge eye, bearings on the said base plate, a spirally grooved looping member provided at its ends with offsets having sliding engagement with the said bearings, and adjusting screws on the said bearings for the offsets to abut against.

In testimony whereof I have signed my name to this specification in the presence of two subscribing witnesses.

GEORGE W. SOUTHWICK.

Witnesses:
Theo. G. Hoster,
Philip D. Rollhaus.